(12) United States Patent
Miller et al.

(10) Patent No.: US 7,567,917 B2
(45) Date of Patent: Jul. 28, 2009

(54) PRODUCT DESIGN METHODOLOGY

(76) Inventors: Kenneth Miller, c/o One80 Design LLC, 555 8th Ave., 17th Floor, New York, NY (US) 10018; Jim F Warner, c/o One80 Design LLC, 555 8th Ave., 17th Floor, New York, NY (US) 10018

( * ) Notice: Subject to any disclaimer, the term of this patent is extended or adjusted under 35 U.S.C. 154(b) by 1228 days.

(21) Appl. No.: 10/388,804

(22) Filed: Mar. 13, 2003

(65) Prior Publication Data

US 2003/0216955 A1 Nov. 20, 2003

Related U.S. Application Data

(60) Provisional application No. 60/364,396, filed on Mar. 14, 2002.

(51) Int. Cl.
*G06Q 10/00* (2006.01)
(52) U.S. Cl. .................... 705/10; 705/7; 705/8
(58) Field of Classification Search ............ 705/10
See application file for complete search history.

(56) References Cited

U.S. PATENT DOCUMENTS

| | | | |
|---|---|---|---|
| 5,627,973 A | 5/1997 | Armstrong et al. | 395/210 |
| 5,963,910 A * | 10/1999 | Ulwick | 705/7 |
| 5,999,908 A * | 12/1999 | Abelow | 705/1 |
| 6,115,691 A | 9/2000 | Ulwick | 705/7 |
| 6,862,585 B2 * | 3/2005 | Planalp et al. | 707/1 |
| 6,937,913 B2 * | 8/2005 | Nishikawa et al. | 700/103 |
| 7,107,224 B1 * | 9/2006 | Weller et al. | 705/10 |
| 2002/0111850 A1 * | 8/2002 | Smrcka et al. | 705/10 |
| 2002/0120490 A1 * | 8/2002 | Gajewski et al. | 705/10 |
| 2003/0028420 A1 * | 2/2003 | DeBiasse | 705/10 |
| 2003/0093310 A1 * | 5/2003 | Macrae | 705/8 |

OTHER PUBLICATIONS

Woodruff, Robert B. Customer value: The next source for competitive advantage, Journal of the Academy of Marketing Science, Spring 1997, v25n2 pp. 139-153, Dialog: File 15.*

* cited by examiner

*Primary Examiner*—Andre Boyce
(74) *Attorney, Agent, or Firm*—Ostrolenk Faber LLP

(57) ABSTRACT

The present invention captures information associated with a manufacturer, the manufacturer's competitors and consumers in order to improve new product and packaging design match consumer needs with the manufacturer's capabilities and competitor strengths. Raw data are translated into actionable information that is used for strategic direction of product and packaging design and development.

23 Claims, 13 Drawing Sheets

| | Capabilities | Constraints | Concerns |
|---|---|---|---|
| Technology 44 | • Extensive manufacturing.<br>• Flexible operations.<br>• R&D facilities.<br>• Engineering skills. | • In-house vs supplier.<br>• Capital costs.<br>• Tooling changes.<br>• Operations modifications. | • Integration.<br>• Co-packer logistics.<br>• Resource availability.<br>• Variable costs. |
| Marketing 46 | • Brand equity.<br>• Consumer knowledge.<br>• Intellectual property.<br>• Sales network.<br>• Pricing power.<br>• Market share. | • Consumer permission.<br>• Customer vs. prospect.<br>• Competitor patents.<br>• Regional weaknesses.<br>• Revenue vs. Volume.<br>• Category growth. | • Internal support.<br>• Data validity/relevance.<br>• Patent expiration.<br>• Learning curve for new product development.<br>• Alienate core consumers.<br>• Competitive inroads. |
| Distribution 48 | • Retailer relationships.<br>• Shipping infrastructure. | • Shelf space limits.<br>• Palletization configurations. | • Open to new products.<br>• Retailer returns. |

Innovation Compass
Client POV

Figure 2

Innovation Compass
Attribute Mapping: Competitor

Innovation Compass
Attribute Vectoring

|  | Client POV | Consumer | Competitor | Design Direction |
|---|---|---|---|---|
| Perception 52 | • Highly skilled R&D and engineering.<br>• New materials familiarity and learning curve.<br>• Extensive Consumer Knowledge In-Home<br>• Need to drive growth and meet profit targets. | • Low performance on key attributes (Protects / On the go)<br>• Opportunity to drive growth in Out-of-Home Eating with package that signals new usage benefits. | • Very high performance on "Protects".<br>• Low perceived value on other key attributes.<br>• General Visual parity. | • Shift new package perceived value on "protects" attribute to drive on-the-go imagery.<br>• Low perceived value on other key attributes.<br>• Own an aesthetic form language<br>• Form direct function |
| In-Use 54 | • High speed and high volume output.<br>• Shelf-life considerations<br>• Co-packer logistics.<br>• Capital Outlay | • Very low in-use performance of key attributes (On-the-go / Protects / Sharing).<br>• Drive growth by enabling new usage occasions with package that delivers. | • Very high on "Protects".<br>• Moderately High on Sharing / Cleaning Eating | • Shift new package in-use value and performance: Protects / Sharing / Clean eating / On-the-go.<br>• Seamless integration between intuitive user usage and badge value. |

Innovation Compass
Waypoint Conclusions

Figure 6

|  | Form | Function 40 | Feasibility |
|---|---|---|---|
| Mandatory 52 | • Unique, relevant imagery vs. Competition.<br>• Leverage strong brand equity from service business.<br>• Large Billboard for Graphics | • Controlled, No-Splash (Anti-Glug) Pour.<br>• Secure, Ergonomic Finger and Thumb Grip<br>• Simple, Secure CR Closure | • Cost-competitive with Stock.<br>• Standard blow-mold operation.<br>• Rapid line speed filling/capping |
| Desirable 54 | • Literal representation of Desirable Attributes<br>• Running water, plumbing reference, industrial/commercial, safe, fast, clean | • Profile that is easy to store<br>• Hard to tip | • Innovate to provide superior benefit<br>• Must be done in short time. |

Concept Core
Design Criteria

Figure 6A

| | Capabilities | Constraints | Concerns |
|---|---|---|---|
| Technology 44 | ■ Multiple bristle counts | ■ Dimension limits of 7" X .33"<br>■ Limits of fusing materials | ■ Anchoring bristle configurations properly<br>■ Color separations |
| Marketing 46 | ■ Brand awareness and equity | ■ Known by consumers as the "no-frills" brand | ■ Declining retail pricing<br>■ Competitive innovation |
| Distribution 48 | ■ Vast distribution network | ■ In-store display dimensions | ■ Lost shelf space |

|  | Client POV | Consumer Insight | Competitive Issues | Design Criteria 40 |
|---|---|---|---|---|
| Perception 52 | • Branding issues<br>• Pricing weakness | • Ergonomic shape<br>• Shelf impact | • Performance advantages on important attributes | • Shifts up:<br>  – Ergonomic shape<br>  – Color combinations |
| In-Use 54 | • In-store issues<br>• Strong Distribution | • Ergonomics.<br>• Functional watch-outs. | • Performance advantages on important functional attributes | • Shifts Up:<br>  – Mouth/cleaning performance<br>  – Gripping<br>• Shifts down:<br>  – Firmness |

Waypoint Conclusions

Figure 11

|  | Form | Function | Feasibility |
|---|---|---|---|
| Mandatory 52 | • Ergonomic shape.<br>• Colors. | • Cleaning power.<br>• Hand feel. | • Runs on existing manufacturing lines. |
| Desirable 54 | • Fit in existing in-store displays. | • Improved mouth feel. | • No more than 8X4 bristle configuration. |

40

Design Criteria

Figure 12

PRODUCT DESIGN METHODOLOGY

CROSS-REFERENCE TO RELATED APPLICATION

This application is based upon and claims priority to U.S. provisional patent application Ser. No. 60/364,396 filed Mar. 14, 2002 and entitled PRODUCT DESIGN METHODOLOGY, the entire contents of which are hereby incorporated by reference.

FIELD OF THE INVENTION

The present invention relates generally to product and packaging development, and, more particularly, to developing a product design strategy to meet the expectations of customers.

BACKGROUND OF THE INVENTION

Manufacturers and marketers seek to improve products and product packaging by providing new and improved concepts, functionality, design aesthetics and efficiency. Products and product packaging that enjoy such improvements are far more likely to succeed in the marketplace. The likelihood of such success is determined, in part, on a consumer's impression of product and product package attributes. As used herein, product and product packaging attributes refer, generally, to characteristics, features, qualities and aesthetics of a product or product packaging.

Manufacturers strive to ensure a product's success by gathering information regarding product and product package attributes from various sources, most notably consumers, and using the information to enhance innovation for new product and packaging design and development. The types of information received and analyzed for product and packaging design also include competitors' products and a manufacturer's internal constraints and capabilities.

Several patents regard work processes and methodologies that seek to evaluate consumer needs and assess performance standards, expectations and/or capabilities. For example, U.S. Pat. No. 5,627,973 to Moore Business Forms, Inc. (the "'973 patent") discusses a method for optimizing business-to-business selling strategies. The patent discloses numerically assessing a customer's needs, calculating a user's ability to meet those needs, and employing a graphical approach to communicate the findings. The methods taught in the '973 patent are directed to determining the value of a potential customer by assessing an "area of opportunity," defined as the difference between a potential customer's score and a user's score.

The methods taught in U.S. Pat. No. 6,115,691 to Ulwick focus on identifying desirable strategic outcomes for a consumer and other participants by processing thousands of relevant market facts and criteria. After considering the demands of all the entities that have an impact on new product development decisions, importance ratings are attributed to the value of individual participants and the array of desired outcomes.

In "New Products Management", Crawford and DiBenedetto discuss "gap analysis" to show how various products in the market are perceived and positioned with regard to key benefits. Information representing a consumer's perceptions are either applied judgmentally, or is captured from consumers and graphically mapped on horizontal and vertical axes that represent two significant product attributes. Voids in the map represent potential opportunities for new products. The Crawford methodology accommodates physical or known factual attributes of products, but does not account for perceptual beliefs that may drive the intent of consumers to purchase.

Prior art methods of improving design solution proposals frequently do not result in products and packaging that are aligned with or further business objectives. This may mean that a product or package is not attractive to consumers, and, therefore, not practical for the manufacturing company. Furthermore, none of the above-identified prior art references go beyond capturing consumer needs, processing the needs in a computer algorithm and revealing alternative product features, revised selling strategies and other decision inputs. For example, the '973 patent does not endeavor to assess a manufacturer's or competitor's existing performance to determine gaps or address the identified needs.

SUMMARY OF THE INVENTION

There is a need for improving product and product packaging development. Moreover, there is a need for improving services, for example, repair services. The present invention uses an analytical framework that captures, integrates and presents information from manufacturers, consumers and competitors in meaningful ways. The present invention presents information regarding products, packaging, and/or services, in such a way as to enable users to make successful new and improved products and product packaging. The present invention further enables users to provide new and improved services.

There is a further need in the industry to take prior art methods several steps further by considering input from manufacturers, consumers and competitors, and identifying shortcomings of existing products and packaging in order to formulate new product and packaging design.

The present invention captures information associated with a manufacturer, the manufacturer's competitors and consumers, for example, by matching consumer needs with a manufacturer's capabilities and a competitor's strengths in order to improve new product and packaging design. The present invention transforms raw data into useful information for strategic planning of product design and development.

The present invention further rates importance attributes regarding aspects of the consumer's interaction with a product, not only a product's desired outcome. A product's desired outcome, in addition, is included in the form of product configurations and features that are driven by product performance gaps on important attributes.

The present invention provides an analytical framework that assists manufacturers and marketers in originating, designing and developing new product and package structure concepts that are efficient to produce and successful in the marketplace. The analytical framework provides clear, detailed strategic design direction for new product and packaging innovation and design projects for manufacturing companies. It is comprised of several analytical tools that capture data from various sources, referred to herein as stakeholders and comprising clients, consumers, and competitors.

The present invention allows for consumers to provide important attributes. Consumers are asked to provide information regarding features, applications and needs for product and product packaging. Consumers are preferably asked to provide such information in their own words, as opposed to being asked to select from a predefined list of choices. Moreover, the present invention identifies new and innovative platform opportunities based on importance and performance measures, and not merely on apparent voids that may or may not accurately provide development strategies for new product and product package design. More particularly, unlike the Crawford et al. method, the present invention measures attribute importance and product performance both for in-use functional attributes, and perceptual attributes.

BRIEF DESCRIPTION OF THE DRAWING(S)

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which:

FIG. 2 shows a client point of view (POV) chart of capabilities, constraints and concerns with respect to new product and packaging implementation;

FIG. 6 illustrates a conclusions template in accordance with the present invention;

FIG. 6A illustrates a design criteria evaluation derived from waypoint conclusions and attribute mapping in accordance with the present invention;

Figure 8:
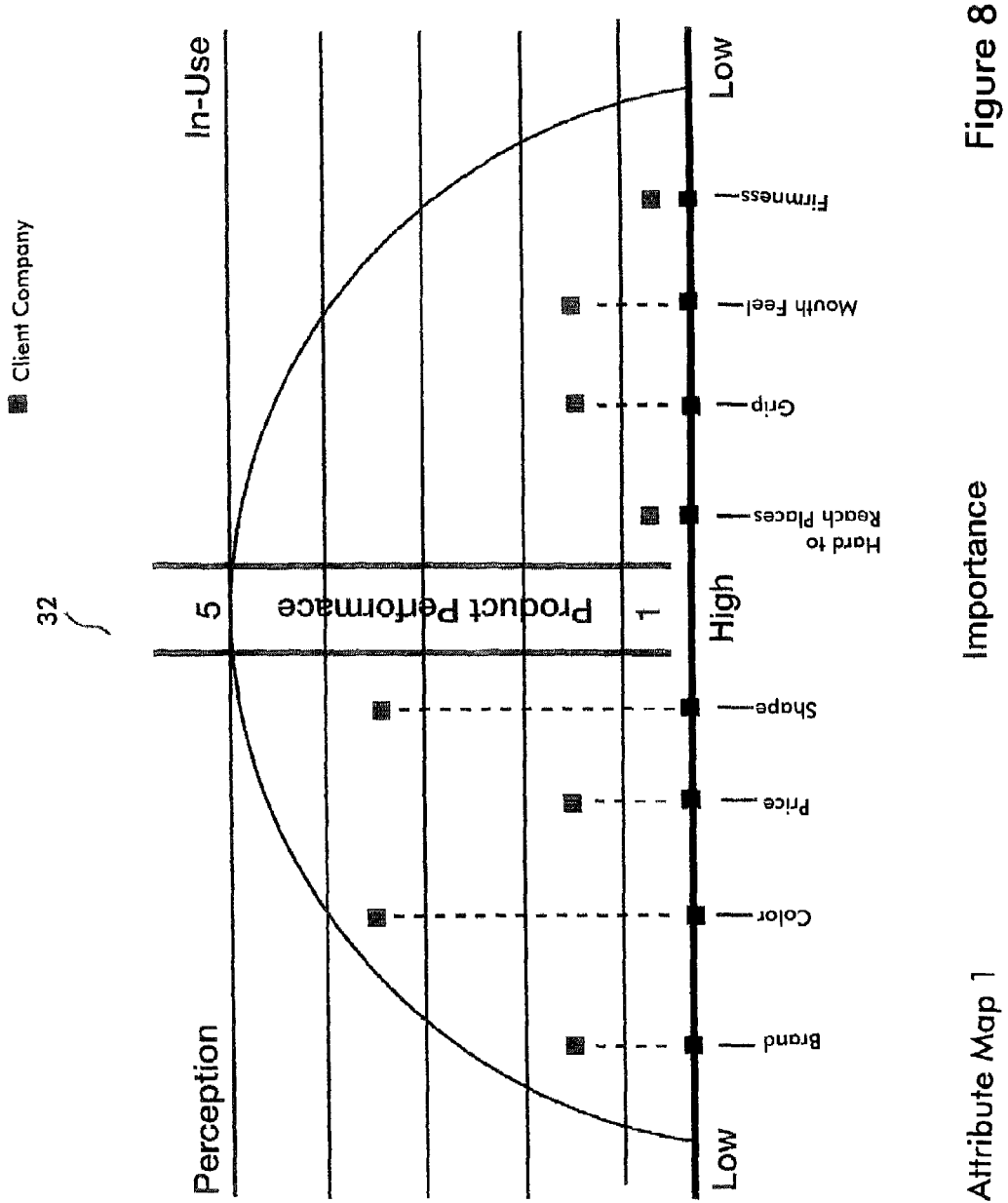
Figure 9:
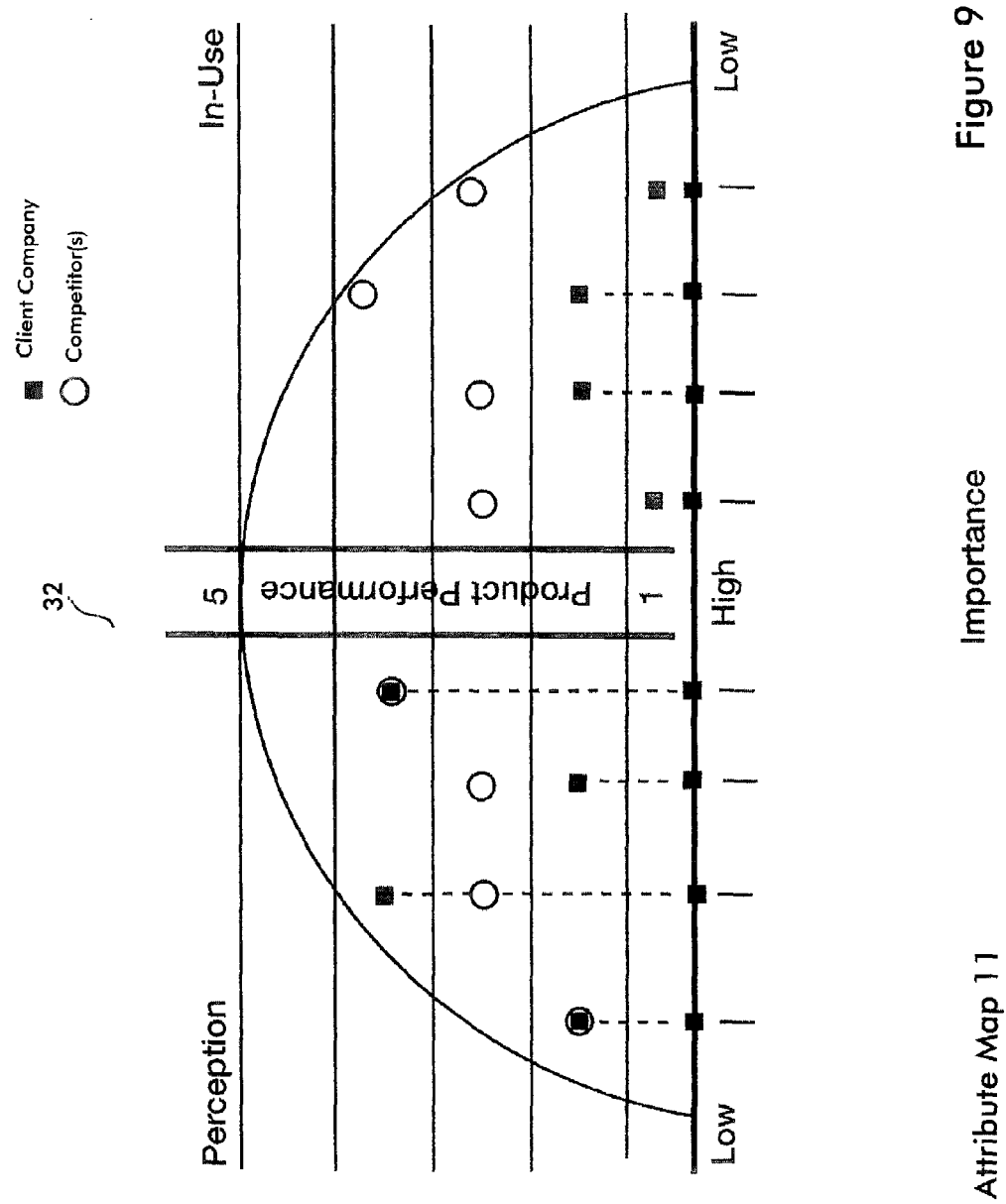
Figure 10:
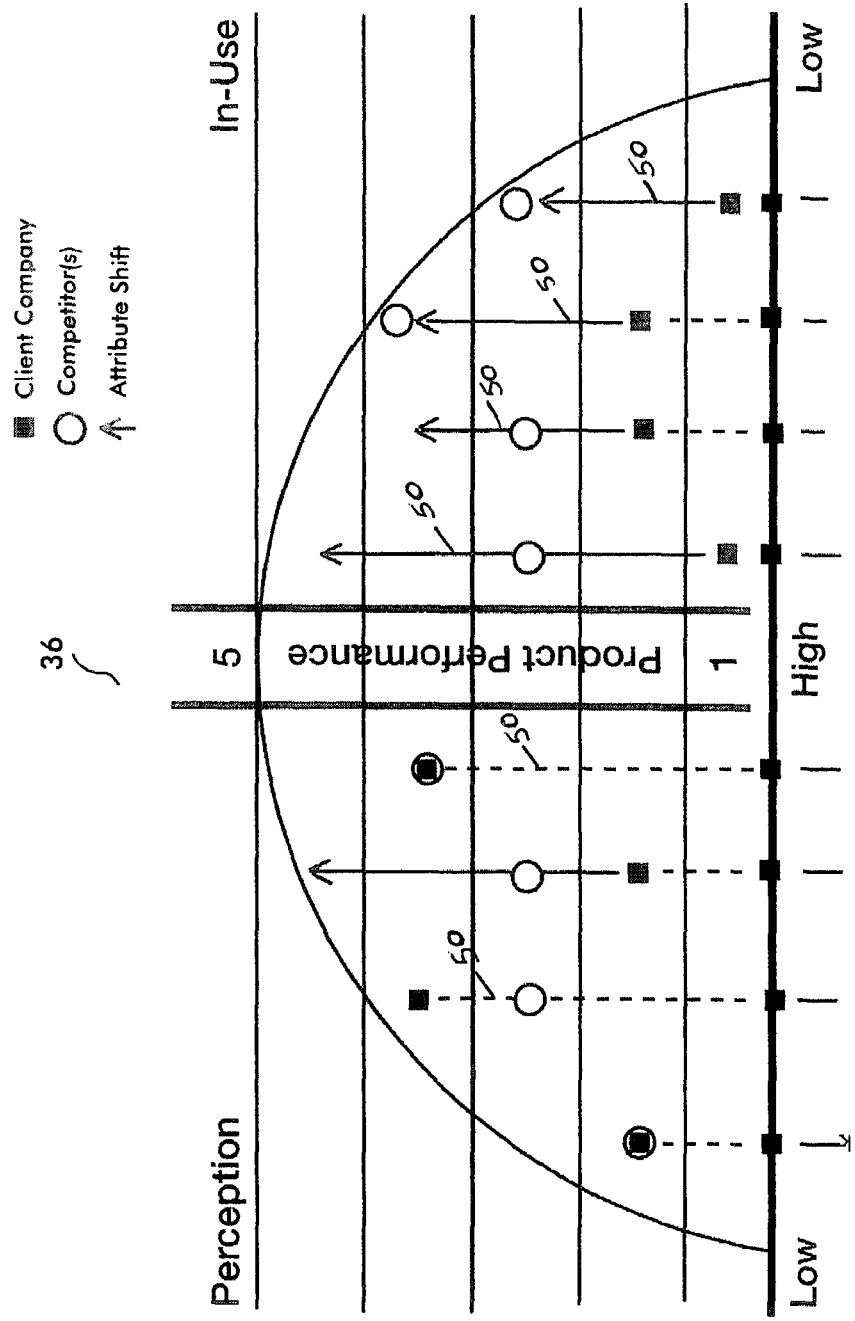

FIG. 7. Is an example client company POV document in accordance with the present invention;

FIG. 8 is an example attribute map in accordance with the present invention;

FIG. 9 is another example attribute map in accordance with the present invention;

FIG. 10 is yet another example attribute map in accordance with the present invention;

FIG. 11 shows an example waypoint conclusions chart, in accordance with the present invention; and FIG. 12 illustrates an example design criteria chart, in accordance with the present invention.

DETAILED DESCRIPTION OF EMBODIMENTS OF THE INVENTION

Figure 1:
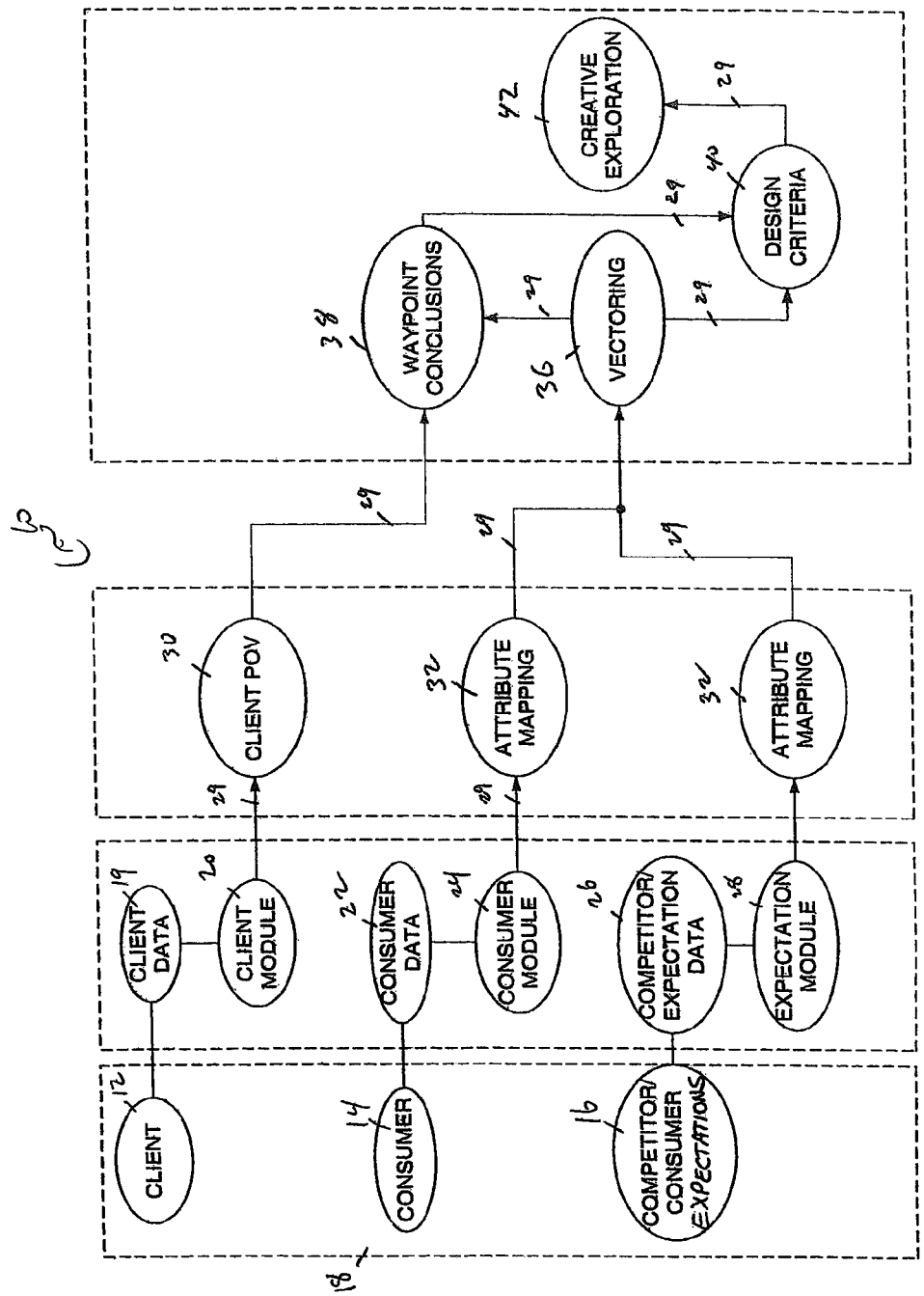
FIG. 1 is block diagram showing a flow chart of a system in accordance with the present invention.

Referring to the drawing figures in which like reference designators refer to like elements, there is shown in FIG. 1 an example of a first preferred embodiment of the present invention, and designated generally as product and packaging design system 10. As shown in FIG. 1, an arrangement of parties to product and packaging design system 10, including client 12, consumer 14 and competitor 16, provide information regarding new and existing products and product packaging. Also shown in FIG. 1, a plurality of modules receive and process information to draw conclusions regarding new and existing products, and, further, to enhance new product and packaging design creativity.

In a preferred embodiment of the present invention, product and packaging design system 10 comprises at least one information processor and at least one user terminal, each of which are coupled to a communication network. The information processor preferably includes all databases necessary to support the present invention. However, it is contemplated that the information processor can access any required databases via any communication network to which information processor may be coupled. The communication network is preferably a global public communication network such as the Internet, but can also be a wide area network (WAN), local area network (LAN), or other network that enables two or more computers to communicate with each other.

In an alternate, second preferred embodiment, product and packaging design system 10 operates within a single user workstation in which all of the functionality described herein is provided. In a single workstation environment, users do not transmit data to and from separate devices. Instead, a fully functional application is installed on a single workstation thereby improving processing time while reducing security threats and technical support services.

As used herein, the term "client" is referred to, generally, as a party who manufactures or sells products and/or services. "Client data" is referred to, generally, as information that represents a client. Further, the term "consumer" refers to a party who will purchase or use the products and/or services provided by clients. "Consumer data" is referred to, generally, as information regarding consumers. Consumers, as used herein, refers to at least one of product users, end-users, industrial users, business users and the like. The term, "consumer," is not meant to be limited strictly to parties who purchase a product for personal use. "Competitor," as used herein, refers to a party who manufacturers or sells products and/or services that compete directly or indirectly with those of clients. "Expectation data" as used herein, refers to information directed to at least one of competitors, competitors' products and a consumer's expectations for product and/or product packaging.

Also as used herein, "product" refers to at least some physical and visual properties of a product, for example product formulation, package structure, graphic imagery, features, benefits, form and functionality. Also as used herein, "product packaging" and "product package" refer to, generally, physical package structure and graphic package design. Physical package structure includes, but is not limited to, containers, closures, articulating parts, delivery systems and lids. Product packaging includes, for example, logos, images, graphic imagery, labels, and package physical structure. Product and product packaging typically have utility, features, benefits, function and aesthetic form appearance, any of which improve from use of the present invention.

Further as used herein, client 12, consumer 14 and competitor 16 are referred to collectively as stakeholders 18. They are referred to as stakeholders 18 because they each have a personal and/or professional stake in the success or failure of a new product and/or product packaging. All three offer important insights into product and package performance expectations and design criteria.

In a preferred embodiment, information is received from client 12, consumer 14 and competitor 16 and used by the present invention for developing strategies with respect to product and packaging design and development. As shown in FIG. 1, client data 19 representing a client's capabilities, constraints and concerns regarding product and packaging development is received in client module 20. Moreover, consumer data 22 is received by consumer module 24 and represents a consumer's 14 experience of directly using a product and/or packaging. Consumer data 22 also represents a consumer's 14 perception of a product or a product brand. Additionally, competitor/expectation data 26 is received by a expectation module 28 and represents at least one of products and packaging offered by competitors, and a consumer's expectation of a product. The client data 19, consumer data 22 and competitor/expectation data 26 are gathered from the stakeholders 18 to identify gaps between a client's 12 capabilities, a competitor's 16 products and a consumer's 14 expectations. Such gaps represent potential new opportunities for a client 12. Information is also provided and analyzed to direct a client's 12 investment of resources for a product's features, to optimize product performance to meet consumer 14 expectations and to address competitive concerns.

As shown in FIG. 1, arrows 29 represent data capture, input and translation from stakeholders 18 for formulating a new product design. The information received from the stakeholders 18 is preferably used for product and packaging concept development, screening, refinement and implementation. Also, as shown in FIG. 1, tools are provided that comprise client point of view (POV) 30, attribute map 32, and waypoint conclusions 34. Client POV 30, described in greater detail below with reference to FIG. 2, represents a client's 12 capabilities, constraints and concerns regarding product and packaging development. Information included in the client POV 30 regards technology, and marketing and distribution and are preferably received from client 12 via interview or questionnaire. For example, information received from client 12 can be formatted as yes/no answers, numerical rankings, or textual responses that are interpreted by consultants and drafted into the client POV 30 chart.

Attribute map 32 includes representations that are, preferably, computer generated charts and graphs that translate market data from consumer 14 and competitor 16 into meaningful information. Waypoint conclusions 38 represent categories of consumer experience and perception of products and product packaging. Waypoint conclusions 38 provides summaries from the stakeholders 18 as a function of the client POV 30 chart and attribute mapping 32, and further provides design direction for improved products, product packaging, and services. Examples of attributes include product or product packaging brand, color, price and shape. Other attributes include specific features of a product or product packaging, for example, how well a product functions, the ease of use or convenience, the look and feel, etc. For example, consumer experience includes a consumer's direct use with a product or product package. Further, a consumer's perception represents beliefs the consumer has for a product, product package or brand.

Product and product packaging attributes are identified in waypoint conclusions 38. Waypoint conclusions 38 provide information directing development of products and packaging to ensure success in the marketplace. The information received from the client 12, consumer 14 and competitor 16, and associated manipulation thereof as represented in the attribute map 32 and client POV 30 is used to provide waypoint conclusions 38 and design criteria 40 for product and product package development. The waypoint conclusions 38 and design criteria 40 eventually are used for new product and packaging creative exploration 42.

FIG. 2 shows a chart of capabilities, constraints and concerns with respect to a client POV 30 for product and product packaging implementation. The chart shown in FIG. 2 is trisected into three sections: technology 42, marketing 44 and distribution 46. Information is provided by a client with respect to the client's capabilities, constraints and concerns, and is used for design criteria evaluation and creative exploration for product and product packaging development.

In the example shown in FIG. 2, the client's technological capabilities include extensive manufacturing, flexible operations, research and development facilities and engineering skills. With respect to marketing 46, the client 12 has the ability to capitalize on brand equity, consumer knowledge, intellectual property protection, a sales network, pricing power and market share. Moreover, with respect to distribution 48, the client's capabilities include retailer relationships and a shipping infrastructure. In the example shown in FIG. 2, a client must balance in-house versus supplier capital costs, tooling changes and operations modifications with respect to technology constraints.

Further in the example client POV 30 shown in FIG. 2 and with respect to marketing 46, a client's constraints include the degree to which one or more consumers allow a product, product packaging or service to change. Other constraints include customer versus prospect marketing, patents issued to competitors, retail weaknesses and category growth by revenue and volume. Further, with respect to distribution 48, a client's constraints include shelf space limitations and palletization configurations. Further, with respect to concerns in a client POV 30, a client's technological integration, co-packer logistics concerns, resource availability and variable cost concerns. With respect to marketing concerns, a client 12 needs to address internal support, data validity and relevance, expiration terms for issued patents and a learning curve for new product development, shown in FIG. 2 as "NPD." Further, with respect to marketing concerns, the client 12 must avoid alienating core consumers, and address competitive in-roads to products and product packaging. Further, with respect to distribution concerns, the client 12 must address being open to new products and handling retailer returns.

With respect to the client POV chart 30 shown in FIG. 2 is exemplary in nature, and is not meant to provide an exhaustive list of potential capabilities constraints and concerns with respect to technology, marketing and distribution for clients. Other types of technological marketing and distribution capabilities concerns and constraints are envisioned herein.

Figure 3:
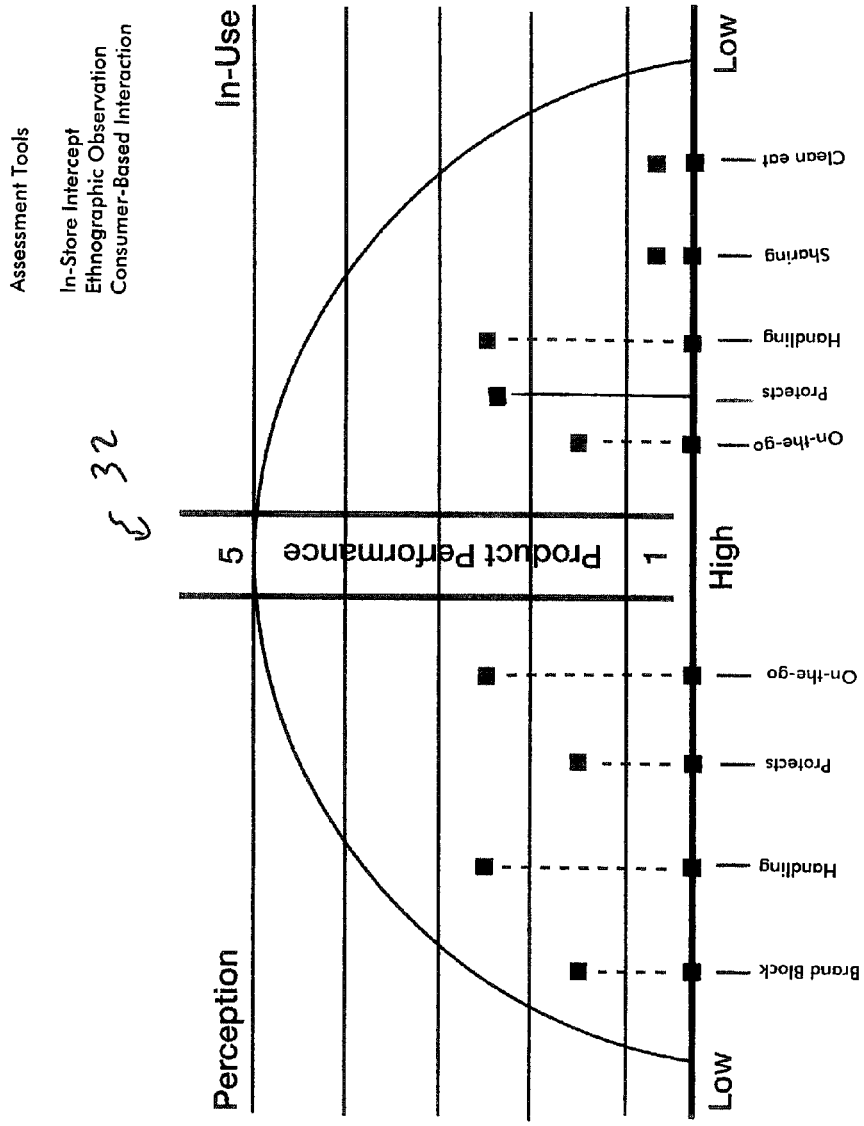
FIG. 3 shows a graph representing a consumer's importance rankings of product and product packaging attributes, and further represents a product's performance with respect to the attributes.
Figure 4:
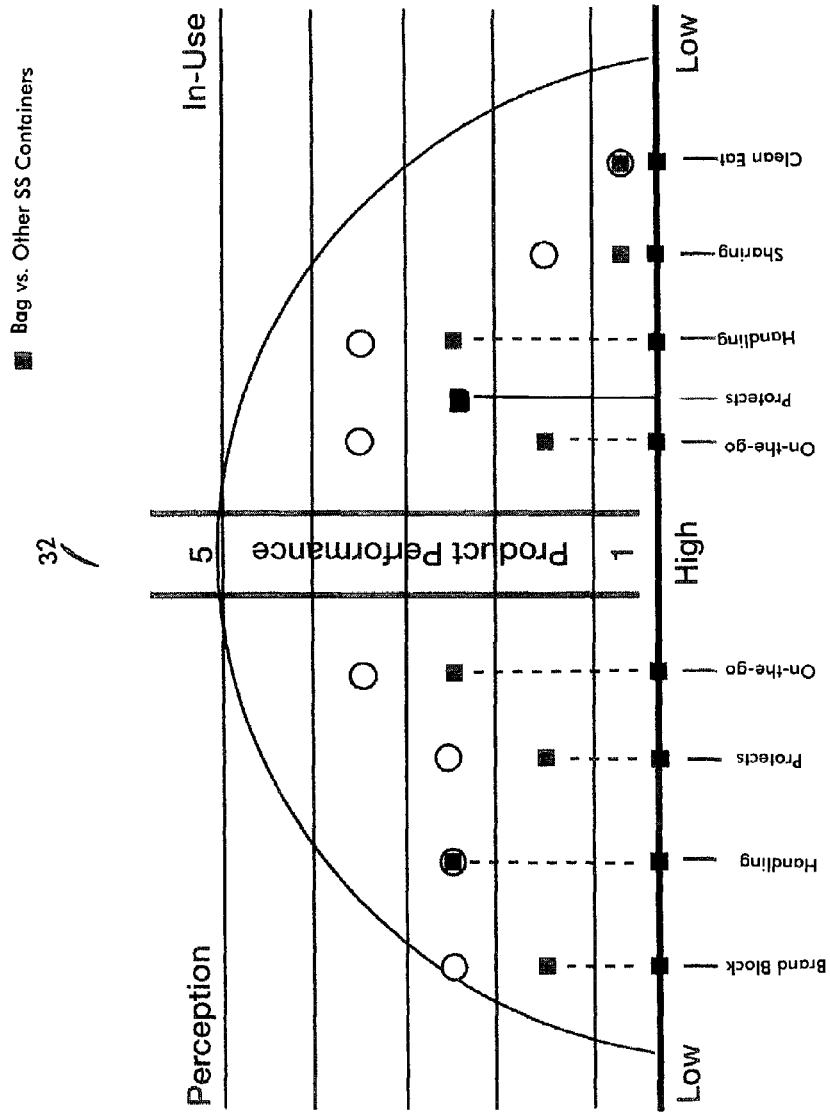
FIG. 4 shows another graph representing a consumer's performance ranking of the attributes shown in FIG. 3 for a competing product or a consumer's expectation of attributes with respect to the product in FIG. 3.
Figure 5:
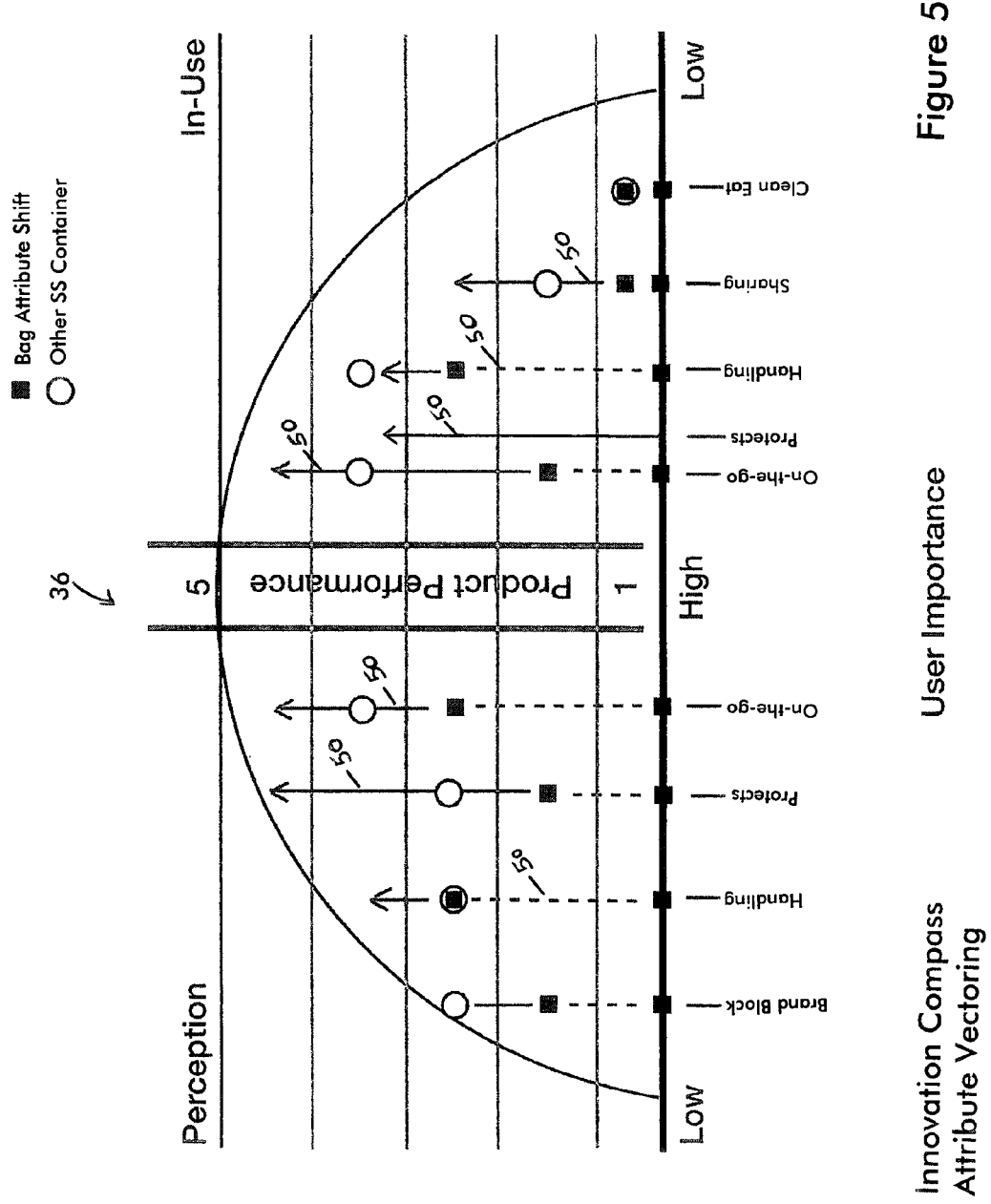
FIG. 5 shows the movement of an attribute from the company's product performance marking to the desired point of performance.

As noted above, the consumer and competitor input is captured in an analytical tool referred to herein as an attribute map 32 (FIGS. 3-5). Attribute maps 32 are computer-generated charts and graphs that translate market data (consumer 14 and competitor 16) into meaningful information. Data are gathered through the use of several in-market research techniques, such as in-store intercepts, where store environments are analyzed and consumers 14 are interviewed to better understand perceptions of existing products, brands and on-shelf presentation. In addition, contextual observation is used to witness how consumers 14 interact with products in true-to-life usage environments. This technique identifies use problems with existing products, and suggests ways to make products and packaging more satisfying and effective.

Another research technique includes consumer interaction sessions which bring consumers 14 together to react to product concepts in 2D rendering and 3D model form. Here, consumers 14 provide feedback on stimuli, and suggest ways to improve preliminary product concepts. The data from these devices are captured in several media for input to a computer for analysis, manipulation and translation into analytical tools included in the present invention.

In accordance with the present invention, an attribute map 32 is divided by two axes. The horizontal axis represents attributes, including needs, applications and features of products, product packaging or services in a given category that consumers 14 feel are important with respect to the respective category shown in attribute map 32, or those categories that serve related needs. Importance is preferably characterized in two ways: perceptually, where consumers 14 hold beliefs about the product or brand, and in-use, where consumers 14 experience the functional benefits of the product (and competing products). Product and packaging features are ranked by importance for both a consumer's 12 perceptual and in-use experience. In accordance with the present invention, very important attributes are mapped in the center, and less important features mapped to the outer edges.

The vertical axis characterizes the performance rating for each attribute, ranked from 1 (low performance) to 5 (high performance). Based on consumer 14 input and other observed data, each attribute is rated for the company's product. Low performance ratings reside at the bottom of the axis, and high performance ratings reside toward the top. In this way, product and packaging attributes that are both important to consumers 14 and where a client 12 product performs well is in the upper center section of the map. Conversely, those attributes that are less important to the consumer 14, and where the client 12 product performs lower, would be marked in the lower left and lower right portions of the map. As shown in FIG. 3, each attribute is preferably rated for the client's 12 existing product or product packaging. In case a client 12 does not have a product or product packaging in a given category, substitute products and/or competitor's products can be referenced.

FIG. 4 shows a second attribute map 32 that represents the performance of competing products, or consumer expectations, for the same consumer 14 favored attributes (FIG. 4). Performance levels are preferably marked for competing products as they are for the client 12 product, to portray vertical alignment for all relevant or chosen products in a category. If there are no competing products, the client 12 product can be mapped against consumer 14 expectations for a product category.

The rankings represented by the attribute map 32 represent conclusions that are used to improve and enhance new product and packaging development. For example, the attribute maps 32 help clients 12 to determine which product attributes are most important to the consumer 14. Additionally, the maps 32 illustrate how well client 12 product performs with respect to the identified attributes, illustrating which attributes require the product to improve performance. Further, the attribute maps 32 illustrate the gaps in performance of attributes between the client 12 product and competing products, or consumer 14 expectations. Moreover, the attribute maps 32 identify the gaps that warrant closing (high importance attributes) and those that may not (low importance attributes) to drive formal product design criteria 40 for innovation and design.

FIG. 5 shows a third attribute map overlay of maps of FIGS. 3 and 4 showing gaps that are desirable to close, illustrated by attribute vectors 50. Attribute vectors 50 show the difference of an attribute with respect to a client 12 product and a desired point on the performance axis. A client 12 product may match or exceed competition and/or consumer 14 expectations for important attributes. In some cases, however, attribute vectors 50 will point in the downward direction, suggesting that performance for a certain attribute should be shifted lower. This may be because the attribute is either not important to the consumer 14, or requires significant resources to deliver desired performance, with little likelihood of realizing comparable return. Desirable shifts in attribute performance, as part of design direction, are preferably represented by upward or downward arrows, depending upon such factors as cost, importance to consumers, competitive position and the like. By closing the gaps, identified by the attribute vectors 50, between product and product packaging performance, substitute products and/or consumer expectations, direction is provided for developing product, product packaging and/or services.

FIG. 6 shows a chart summarizing waypoint conclusions 38 that are preferably drawn from the attribute map 32 portrayed in FIGS. 3-5. For purposes of illustrating the present invention, the example waypoint conclusions 38 chart shown in FIG. 6 regards the consumer product packaging, snack food bags.

By reviewing waypoint conclusions 38, in part based on attribute map 32, product and packaging design direction strategy is efficiently developed. Frequently, this involves shifting concentration of a product attribute during product development in order to meet a client's 12 expectations. As shown in FIG. 6, design direction 40 identifies actions to be taken with respect to new product and packaging attributes. Attribute shifts are recommended that represent future product and packaging development.

The example waypoint conclusions chart 38, shown in FIG. 6, is bisected into perception 52 and in-use 54. While the waypoint conclusions chart 38 in FIG. 6 shows a bisection of consumers' perception and in-use experience, the invention is not so limited. The waypoint's conclusions chart 38 can be arranged with other important criteria. Perception 52 represents a client's 12, consumer's 14 or competitor's 16 perception of products and product packaging. To meet a consumer's 14 perception of a product, a client 12 will perform highly skilled research and development engineering strategies. Further, new materials and any corresponding learning curves are identified for a client 12 as well as the degree to which consumers 14 have knowledge of a particular product. A client 12 will have a need to drive growth and meet profit targets for a new product as well.

FIG. 6A illustrates a chart identifying a design criteria for a container from which liquid can be poured. FIG. 6A illustrates how waypoint conclusions 38 and attribute map 32 provide design criteria 40 for a creative exploration 42. The creative exploration 42 yields product and package concepts that are focused on issues of importance to each stakeholder, and the opportunities characterized by the attribute vectors 50. Design criteria 40 comprise performance objectives that the new product concepts must meet in order to satisfy stakeholder needs and desires. Preferably, a computer-generated criteria chart takes input from the client POV 30 document and waypoint conclusions 38 chart to list mandatory and desirable performance criteria for the new product. These criteria are used to evaluate new product concepts that are generated out of the subsequent creative exploration 42. As shown in FIG. 6A, the form is bisected into two sections: mandatory 52 and desirable 54. Criteria are organized by headings including form, function and feasibility, and then characterized as mandatory or desirable. Mandatory criteria are those attributes that the product concept must display, while desirable criteria are those attributes that the team considers important, but not critical in the evaluation of the concept.

The creative exploration 42 is the subsequent process of generating new product and/or feature concepts in accordance with the product innovation strategy and innovation platforms outlined in the analytical tools that emanate from the present invention.

To further illustrate the features of the present invention, FIGS. 7-12 show an example product and product package development for a toothbrush. FIG. 7 shows a client POV 30 session with the client 12, a major consumer healthcare company. Here, a company marketing, research and development and production staff identify constraints. For example, they can only fuse two materials and work with certain dimensions. Also identified are capabilities, for example, they can accommodate multiple colors, bristle configurations and handle forms. Further, client concerns are identified, for example they worry about declining prices in the category. Entries are preferably made in a computer, for example, in a grid template that accommodates data for capabilities, constraints and concerns, and segments that data by dimensions including technology, marketing and distribution.

The example client POV 30 report shown in FIG. 7 is preferably issued to the client 12 for concurrence, and used to inform the creative exploration 42 that follows the innovation. The data are used to insure that the product concepts generated take into account the client's 12 technological, marketing and distribution capabilities.

Next, a knowledge base is built of the consumer 14 and competitor set, represented in an attribute map 32. As noted above, attribute maps 32 are computer-generated graphs that translate consumer 14 data into easily communicated information. Research techniques include spending time at the store shelves interacting with consumers 14 to find out about what is perceptually important at the point of sale. Moreover, homes may be visited to observe how current toothbrushes are used, how they are deficient and what innovation opportunities might surface. The client's 12 and competitor's 16 products are preferably subjected to performance testing for, for example, ergonomics, wear and cleaning ability among consumers 14. These attributes are plotted along the horizontal axis of the graph.

The example attribute map 32 shown in FIG. 8 identifies attributes of toothbrushes that consumers 14 believe are important in terms of in-use and perceptual dimensions. It also shows how the client's 12 existing product performs with respect to those dimensions. The performance is marked along the vertical axis above each attribute.

The attribute map 32 shown in FIG. 9 illustrates the performance of competing products with respect to the important attributes represented in attribute map 32. The difference between the performance of the client's 12 product and competing products on each attribute is preferably considered a performance gap.

In attribute map 32 (FIG. 10) certain gaps are chosen as the basis for the design criteria 40, and represented with attribute vectors 50 indicating the direction of the proposed shift in attribute performance for the client's 12 existing or new product. Performance gaps are chosen for strategic focus based on their size, the importance of the attribute and the cost of attaining that performance shift. Some proposed attribute shifts are upward, in the direction of greater performance. Some proposed attribute shifts are downward, in the direction of lower performance. The latter might be proposed in the case where the client's 12 product is performing far above competition on an attribute that is relatively unimportant to the consumer 14. Here, performance reduction may save cost and provide a less complex message to consumers 14 regarding several less important product benefits.

Attribute vectors 36 represent a need to move the client's 12 product performance on several attributes to the point of parity with the most successful product in the category. It also directs a reduction in investment for attributes not considered important. Attribute map 32 presents a product innovation strategy that is the foundation of the design criteria 40 outlined in a waypoint conclusions 38 document to follow. Attribute maps 32 are preferably shared with the staff of the client 12 to insure consensus on important consumer 14 attributes, performance ratings, and the product innovation strategy.

Waypoint conclusions 38 (FIG. 11) serve to summarize all learning from all stakeholders 18. A computer-generated template segments the information by client 12, consumer 14 and competitor 16. This information, as referred to above, is then bisected into information concerning perceptual attributes and in-use attributes, as does the attribute map 32. In addition, the waypoint conclusions 38 document outlines platforms for innovation driven by the product innovation strategy, that is, in turn, based on the attribute importance and performance gap analysis of the attribute map 32. This document is shared with the client 12 for concurrence on the product innovation strategy and platforms for innovation.

Waypoint conclusions 38 and attribute map 32 are then used to devise criteria for a creative exploration 42. Criteria consist of performance objectives that new toothbrush product concepts must meet in order to satisfy all stakeholder needs. A computer generated criteria chart takes input from the client POV 30 document and waypoint conclusions 38 document to list mandatory and desirable performance criteria for the new product. Here (FIG. 12), a criteria chart represents the criteria all toothbrush concepts will be evaluated by in a later creative exploration 42 work session. The creative exploration 42 is the creative process of generating new toothbrush concepts in accordance with the innovation platforms and product innovation strategy outlined herein.

In the Implementation Compass segment, a subset of concepts is taken into refinement and further exploration. Another screening effort identifies the most promising concept for consumer validation (Assessment Tool such as consumer interaction with prototypes). Refinements resulting from this activity are followed by design specifications and finalization, in preparation for engineering and preparation for manufacturing.

The systems and methods described herein provides for dramatic sales growth, production efficiency and consumer loyalty, thereby ensuring a high likelihood of product and product packing success in the market place. By employing embodiments of the present invention, clients are assured that the products and packaging they produce are satisfying and effective for consumers.

Although the present invention has been described in relation to particular embodiments thereof, many other variations and modifications and other uses will become apparent to those skilled in the art. For example, the present invention can be applied to product design, package structure and concept ideation disciplines.

Furthermore, the systems and methods of the present invention are effective for the service industry. For example, businesses in the repair service industry are more likely to succeed when the systems and methods described herein are employed. Continuing with the repair service industry example, a client POV 22 comprising a service provider's capabilities, constraints and concerns is developed with respect to providing repair services. Moreover, attribute mapping is preferably performed to identify rankings of attributes for a client's performance, a competitor's performance and/or a consumer's expectation's of performance. By reviewing vectors between the attribute maps, gaps illustrated by the vectors can be closed and service design direction can be implemented as a function of waypoint conclusions 24 and design criteria 28, thereby ensuring improved service-related performance. The systems and methods described herein are applicable to scores of other businesses in the service industry, including, for example, the food industry, the medical industry, the legal industry and the computer and technology industry.

It is preferred, therefore, that the present invention be limited not by the specific disclosure.

What is claimed is:

1. A system utilizing at least one electronic computing device for providing direction for developing at least one of a product, a product packaging and service, said system comprising:

a client information module stored in memory of said electronic computing device, said client information module receiving and storing client information, said client information comprising at least one of a client's capability, a client's constraint and a client's concern for developing said at least one of a product, a product packaging and service;

a consumer information module stored in memory of said electronic computing device, said consumer information module receiving and storing consumer information, said consumer information representing at least one of a consumer's perception of at least one of a first product, a first product package and a first service, and a consumer's experience with at least one of said first product, said first product package and said first service;

a competitor information module stored in memory of said electronic computing device, said competitor information module receiving and storing competitor information, said competitor information representing at least one of a second product produced by a competitor, a second product packaging produced by a competitor, a second service provided by a competitor, a consumer's expectation of a second product, a consumer's expectation of a second product packaging, and a consumer's expectation of a second service;

an information valuing module stored in memory of said electronic computing device, said information valuing module being operated on by said electronic computing device and employing an algorithm to provide a client information value, a consumer information value and a competitor information value that represent said client information, said consumer information and said competitor information, respectively, said client information module being operated on by said electronic computing device and forming a matrix for identifying the client's capabilities, constraints and concerns in relationship to at least one of technology, marketing and distribution of the product, product packaging or service, the matrix allowing the client's capabilities, constraints and concerns affecting the product, product packaging or service connected to at least the technology, marketing and distribution of the product, product packaging or service to be identified, said information valuing module being operated on by said electronic computing device and mapping said consumer information as defined attributes of the first product, first product packaging or first service in a graphical format reflecting the consumer's perception and experience as values versus the defined attributes, said information valuing module being operated on by said electronic computing device and mapping said competitor information as defined attributes of the second product, second product packaging or second service or the consumer's expectations of the second product, second product packaging or service in said graphical format as values versus the defined attributes;

an information ranking module stored in memory of said electronic computing device, said information ranking module being operated on by said electronic computing device and using an algorithm to rank said client information value, said consumer information value and said competitor information value in terms of user importance in said graphical format; and a development module stored in memory of said electronic computing device, said development module being operated on by said electronic computing device and directing development of said at least one of a product, a product packaging and service by identifying differences between said client information value, said consumer information value and said competitor information value as a function of said information ranking module and determining at least one attribute vector directing development of said product, product packaging or service based on said differences in a defined direction, said at least one attribute vector being developed by comparing the client information value, consumer information value and competitor information value in said graphical format, the at least one attribute vector having a relevance to the development of the product, product packaging or service determined by the size of the attribute vector as determined by the differences and further as determined by the ranking of the values by the information ranking module that determines the location of said attribute vector in said graphical format.

2. The system of claim 1, wherein said client information module further provides at least one representation of technology, marketing and distribution for developing said at least one of a product, a product packaging and service.

3. The system of claim 1, wherein said client capabilities include said client's ability to provide at least one of manufacturing and operations, research and development, engineering, materials, brand equity, intellectual property, a sales network, market share, pricing power, retailer relationships, a shipping infrastructure, distribution and palletization.

4. The system of claim 1, wherein said client constraints include limitations of said client to provide at least one of in-house manufacturing, supplier costs, tooling changes, operations modifications, consumer permission to change said at least one of a product, a product packaging and service, compatibility and processing, predisposed image, up-to-date status, time limitations, volume versus unit costs, stocking and detailing, and specific retail venues.

5. The system of claim 1, wherein said client concerns include at least one of flexibility, margins, resources, cost and lead time, support, validation, work-arounds, share growth, shelf look and retailer return.

6. The system of claim 1, wherein said information ranking module operates electronically.

7. The system of claim 1, wherein said consumer information further comprises a consumer's assessment of attributes for at least one of said first product, said first product package, said first service, a product category, client needs, applications and features of said at least one of a product, a product packaging and service, wherein said consumer's assessment represents a degree of importance said consumer has for said attributes.

8. The system of claim 7, wherein said consumer perception includes a belief held by said consumer of said attributes.

9. The system of claim 7, wherein said consumer experience represents impressions of said attributes held by said consumer as a function of said consumer's direct use of at least one of said first product, said first product package and said first service.

10. The system of claim 7, further comprising a mapping module, said mapping module providing a first graphical representation of said consumer information and a second graphical representation of at least one of said competitor information, competitor product performance and consumer expectation, and superimposing said first graphical representation and said second graphical representation.

11. The system of claim 1, further comprising a means for shifting concentration of development efforts from a first attribute of said product and product packaging to a second attribute of said at least one of a product, a product packaging and service as a function of said information ranking module.

12. The system of claim 1, wherein said consumer information module is adapted to receive consumer information from at least one of interviews, questionnaires and by observing consumers that interact with said at least one of a product, product packaging and a service.

13. A method of utilizing at least one electronic computing device for providing direction for developing at least one of a product, a product packaging and service, said method comprising:

providing client information to the computing device, said client information representing at least one of a client's capability, constraint and concern for developing said at least one of a product, a product packaging and service;

providing consumer information to the computing device, said consumer information representing a consumer's perception and experience with at least one of a first product, a first product packaging and a first service;

providing expectation information to the computing device, said expectation information representing at least one of:

a) a consumer's expectation of at least one of a second product, a second product packaging and a second service; and b) at least one of said second product, said second product packaging and said second service, said second product, said second product packaging and said second service produced by a competitor;

calculating using the electronic computing device a client information value, a consumer information value and an expectation information value to represent said client information, said consumer information and said expectation information, respectively, forming using the electronic computing device a matrix for identifying the client's capabilities, constraints and concerns in relationship to at least one of technology, marketing and distribution of the product, product packaging or service, the matrix allowing the client's capabilities, constraints and concerns affecting the product, product packaging or service connected to at least the technology, marketing and distribution of the product, product packaging or service to be identified;

mapping using the electronic computing device said consumer information value against at least one defined attribute of the first product, first product packaging or first service in a graphical format reflecting the consumer's perception and experience;

mapping using the electronic computing device said expectation information value against at least one defined attribute of the second product, said product packaging or second product service in said graphical format;

ranking using the electronic computing device said client information value, said consumer information value and said expectation information value in terms of user importance in said graphical format; and using the electronic computing device, basing development of said at least one of a product, product packaging and service on differences discovered between said client information value, said consumer information value and said expectation information value as a function of said step of ranking; and determining using the electronic computing device at least one attribute vector directing development of said product, product packaging or service based on said differences in a defined direction, said at least one attribute vector being developed by comparing the client information value, consumer information value and competitor information value in said graphical format;

the at least one attribute vector having a relevance to the development of the product, product packaging or service determined by the size of the attribute vector as determined by the differences and further as determined by the ranking of the values as determined by the location of said attribute vector in said graphical format.

14. The method of claim 13, wherein said client information further represents at least one of technology, marketing and distribution for developing said at least one of a product, a product packaging and service.

15. The method of claim 13, wherein said client capabilities include said client's ability to provide at least one of manufacturing and operations, research and development, engineering, materials, brand equity, intellectual property, a sales network, market share, pricing power, retailer relationships, a shipping infrastructure, distribution and palletization.

16. The method of claim 13, wherein said client constraints include limitations of said client to provide at least one of in-house manufacturing, supplier costs, tooling changes, operations modifications, consumer permission to change said at least one of a product, a product packaging and service, compatibility and processing, predisposed image, up-to-date status, time limitations, volume versus unit costs, stocking and detailing, and specific retail venues.

17. The method of claim 13, wherein said client concerns include at least one of flexibility, margins, resources, cost and lead time, support, validation, work-arounds, share growth, shelf look and retailer return.

18. The method of claim 13, wherein said consumer information comprises a consumer's assessment attributes of said at least one of a product, a product packaging and service, client needs, applications and features of said at least one of a product, a product packaging and service wherein said consumer's assessment includes a degree of importance said consumer has for said attributes.

19. The method of claim 18, wherein said consumer perception includes a belief held by said consumer of said attributes.

20. The method of claim 18, wherein said consumer experience represents impressions of said attributes held by said consumer as a function of said consumer's direct use of said at least one of said first product, said first product packaging and said first service.

21. The method of claim 13, further comprising graphically representing said consumer information on a first overlay and said expectation information on a second overlay, and performing said step of ranking by superimposing said first overlay and said second overlay.

22. The method of claim 13, further comprising shifting concentration of development efforts from a first attribute of said at least one of a product, a product packaging and service to a second attribute of said at least one of a product, a product packaging and service as a function of said ranking.

23. The method of claim 13, further comprising receiving said consumer information by at least one of an interview, a questionnaire or by observing consumers' behavior.

* * * * *